(12) United States Patent
Caprioli et al.

(10) Patent No.: US 10,387,324 B2
(45) Date of Patent: Aug. 20, 2019

(54) METHOD, APPARATUS, AND SYSTEM FOR EFFICIENTLY HANDLING MULTIPLE VIRTUAL ADDRESS MAPPINGS DURING TRANSACTIONAL EXECUTION CANCELING THE TRANSACTIONAL EXECUTION UPON CONFLICT BETWEEN PHYSICAL ADDRESSES OF TRANSACTIONAL ACCESSES WITHIN THE TRANSACTIONAL EXECUTION

(75) Inventors: Paul Caprioli, Hillsboro, OR (US); Abhay S. Kanhere, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/976,846

(22) PCT Filed: Dec. 8, 2011

(86) PCT No.: PCT/US2011/063888
§ 371 (c)(1),
(2), (4) Date: Jun. 27, 2013

(87) PCT Pub. No.: WO2013/085518
PCT Pub. Date: Jun. 13, 2013

(65) Prior Publication Data
US 2013/0275715 A1 Oct. 17, 2013

(51) Int. Cl.
*G06F 12/10* (2016.01)
*G06F 9/52* (2006.01)
*G06F 12/1027* (2016.01)

(52) U.S. Cl.
CPC .............. *G06F 12/10* (2013.01); *G06F 9/528* (2013.01); *G06F 12/1027* (2013.01)

(58) Field of Classification Search
CPC ..................................................... G06F 9/528
See application file for complete search history.

(56) References Cited

U.S. PATENT DOCUMENTS 5,724,538 A * 3/1998 Morris ............... G06F 12/1018
711/206
6,493,812 B1 * 12/2002 Lyon ............................ 711/207
(Continued)

FOREIGN PATENT DOCUMENTS

| TW | 200842580 A | 11/2008 |
|---|---|---|
| TW | 201131358 A | 9/2011 |
| WO | 2013/085518 A1 | 6/2013 |

OTHER PUBLICATIONS

International Preliminary Report on Patentability and Written Opinion received for PCT Patent Application No. PCT/US2011/063888, dated Jun. 19, 2014, 5 pages.
(Continued)

*Primary Examiner* — Rocio Del Mar Perez-Velez
*Assistant Examiner* — Chie Yew
(74) *Attorney, Agent, or Firm* — Nicholson De Vos Webster & Elliott, LLP

(57) ABSTRACT

An apparatus and method is described herein for providing structures to support software memory re-ordering within atomic sections of code. Upon a start or end of a critical section, speculative bits of a translation buffer are reset. When a speculative memory access causes an address translation of a virtual address to a physical address, the translation buffer is searched to determine if another entry (a different virtual address) includes the same physical address. And if another entry does include the same physical address, the speculative execution is failed to provide protection from invalid execution resulting from the memory re-ordering.

22 Claims, 4 Drawing Sheets

(56) References Cited

U.S. PATENT DOCUMENTS

| | | | |
|---|---|---|---|
| 6,615,337 B1* | 9/2003 | Clark et al. | 711/205 |
| 7,398,359 B1* | 7/2008 | Miller et al. | 711/141 |
| 7,502,897 B2 | 3/2009 | Hertzberg et al. | |
| 7,542,977 B2 | 6/2009 | Hudson et al. | |
| 7,685,365 B2 | 3/2010 | Rajwar et al. | |
| 7,725,662 B2 | 5/2010 | Saha et al. | |
| 7,984,248 B2 | 7/2011 | Kottapalli et al. | |
| 8,176,266 B2 | 5/2012 | Kottapalli et al. | |
| 8,180,967 B2 | 5/2012 | Rajwar et al. | |
| 2002/0065993 A1* | 5/2002 | Chauvel | 711/144 |
| 2003/0033510 A1* | 2/2003 | Dice | G06F 9/383 712/235 |
| 2004/0215898 A1* | 10/2004 | Arimilli et al. | 711/144 |
| 2006/0294326 A1* | 12/2006 | Jacobson et al. | 711/156 |
| 2007/0061547 A1* | 3/2007 | Jordan | G06F 12/1027 711/207 |
| 2007/0143287 A1* | 6/2007 | Adl-tabatabai | G06F 9/467 |
| 2007/0156994 A1* | 7/2007 | Akkary | G06F 9/3004 711/167 |
| 2008/0288730 A1* | 11/2008 | Heller, Jr. | G06F 12/0817 711/159 |
| 2009/0031310 A1* | 1/2009 | Lev | G06F 11/1405 718/101 |
| 2009/0037614 A1 | 2/2009 | Saripalli | |
| 2009/0133032 A1* | 5/2009 | Biles et al. | 718/106 |
| 2009/0198694 A1* | 8/2009 | Thomas | 707/8 |
| 2010/0070727 A1* | 3/2010 | Harris | G06F 9/528 711/163 |
| 2010/0169894 A1 | 7/2010 | Sheaffer et al. | |
| 2010/0218195 A1* | 8/2010 | Adl-Tabatabai et al. | 718/107 |
| 2010/0332765 A1* | 12/2010 | Cypher | 711/141 |
| 2011/0167416 A1* | 7/2011 | Sager | G06F 8/4442 717/149 |

OTHER PUBLICATIONS

International Search Report and Written Opinion received for PCT Patent Application No. PCT/US2011/063888, dated Jul. 30, 2012, 5 pages.

Office Action received for Taiwanese Patent Application No. 101142182, dated Sep. 2, 2014, 3 pages of Office Action and 2 pages of Search Report.

* cited by examiner

METHOD, APPARATUS, AND SYSTEM FOR EFFICIENTLY HANDLING MULTIPLE VIRTUAL ADDRESS MAPPINGS DURING TRANSACTIONAL EXECUTION CANCELING THE TRANSACTIONAL EXECUTION UPON CONFLICT BETWEEN PHYSICAL ADDRESSES OF TRANSACTIONAL ACCESSES WITHIN THE TRANSACTIONAL EXECUTION

CROSS-REFERENCE TO RELATED APPLICATION

This patent application is a U.S. National Phase Application under 35 U.S.C. § 371 of International Application No. PCT/US2011/063888, filed Dec. 8, 2011, entitled A METHOD, APPARATUS, AND SYSTEM FOR EFFICIENTLY HANDLING MULTIPLE VIRTUAL ADDRESS MAPPINGS DURING TRANSACTIONAL EXECUTION.

FIELD

This disclosure pertains to the field of integrated circuits and, in particular, to address translation in processors.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

The ever increasing number of cores and logical processors on integrated circuits enables more software threads to be concurrently executed. However, the increase in the number of software threads that may be executed simultaneously have created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. Either way, after extrapolating this simple example into a large scalable program, it is apparent that the complexity of lock contention, serialization, fine-grain synchronization, and deadlock avoidance become extremely cumbersome burdens for programmers.

Another recent data synchronization technique includes the use of transactional memory (TM). Often transactional execution includes executing a grouping of a plurality of micro-operations, operations, or instructions atomically. In the example above, both threads execute within the hash table, and their memory accesses are monitored/tracked. If both threads access/alter the same entry, conflict resolution may be performed to ensure data validity. One type of transactional execution includes Software Transactional Memory (STM), where tracking of memory accesses, conflict resolution, abort tasks, and other transactional tasks are performed in software, often without the support of hardware. Another type of transactional execution includes a Hardware Transactional Memory (HTM) System, where hardware is included to support access tracking, conflict resolution, and other transactional tasks.

As can be seen, TM has the potential to provide better performance among multiple threads. And within transactions, compilers and binary translators would like to re-order load and stores within a transactional region to further optimize code and make it more efficient. However during such re-ordering static analysis or runtime checks determine accesses to the same virtual address that may violate memory access ordering rules. In this scenario, a compiler or binary translator may be able to avoid a read after write (RAW), a write after read (WAR), or a write after write (WAW) to the same virtual memory address. Yet, software is often unable to detect a case where two different virtual addresses are utilized, but the two different virtual address are part of virtual address spaces that are mapped to the same physical address space. As a result, the two different virtual address potentially map to the same physical address. Consequently during optimization, software re-orders a load or store to different virtual addresses that map to the same physical address; however, such a re-ordering potentially results in invalid data/execution.

BRIEF DESCRIPTION OF THE DRAWINGS

The present invention is illustrated by way of example and not intended to be limited by the figures of the accompanying drawings.

DETAILED DESCRIPTION

Figure 1:
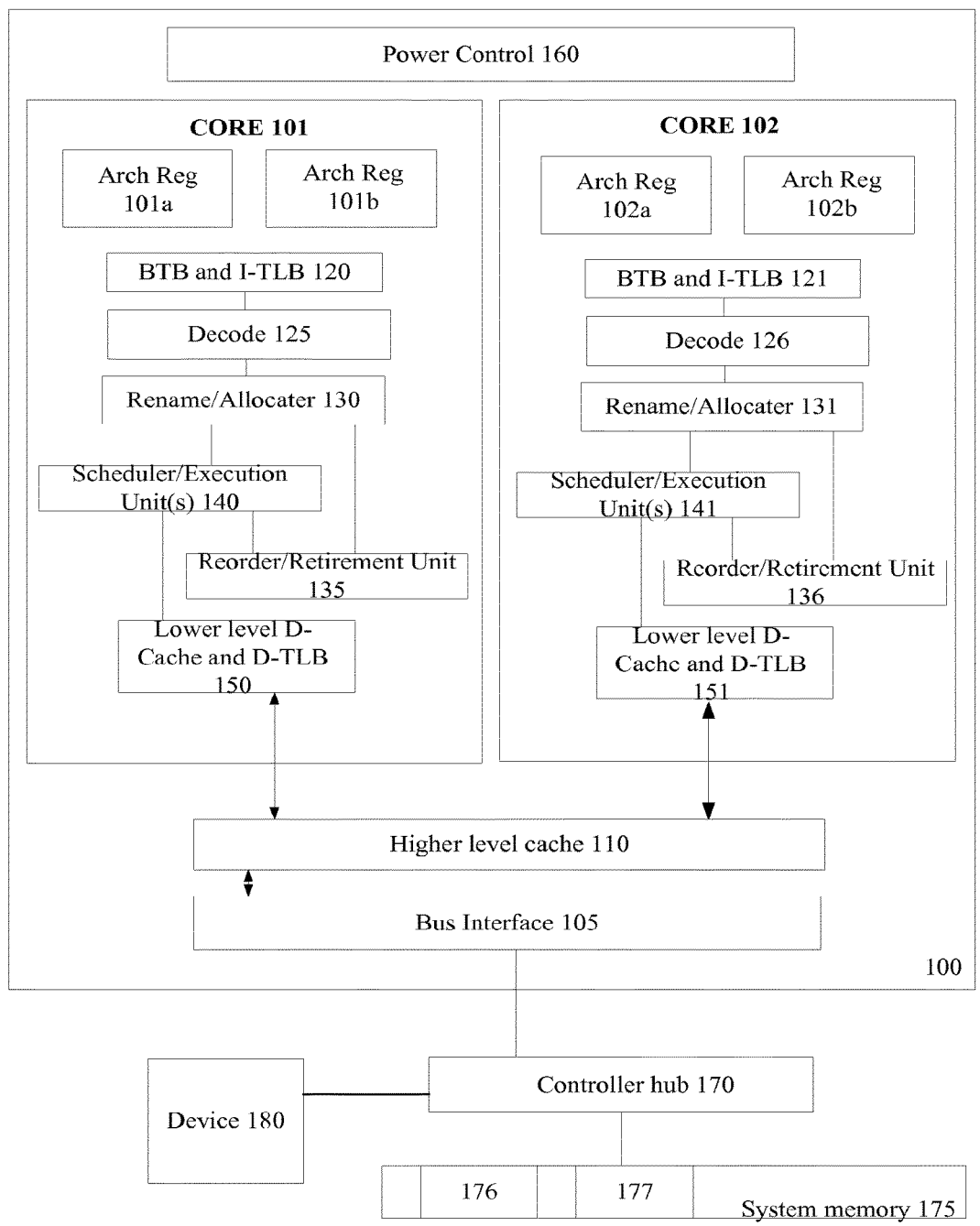
FIG. 1 illustrates an embodiment of a logical representation of a system including processor having multiple processing elements (2 cores and 4 thread slots).

In the following description, numerous specific details are set forth, such as examples of specific types of specific processor configurations, specific hardware structures, specific architectural and micro architectural details, specific register configurations, specific address matching techniques, specific types of address spaces, etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific address translation details, specific operation of decoders, specific format of instructions, specific transactional memory structures, and other specific operational details of processors haven't been described in detail in order to avoid unnecessarily obscuring the present invention.

Although the following embodiments are described with reference to a processor, other embodiments are applicable to other types of integrated circuits and logic devices. Similar techniques and teachings of embodiments described herein may be applied to other types of circuits or semiconductor devices that can benefit from higher throughput and performance. For example, the disclosed embodiments are not limited to computer systems. And may be also used in other devices, such as handheld devices, systems on a chip (SOC), and embedded applications. Some examples of handheld devices include cellular phones, Internet protocol devices, digital cameras, personal digital assistants (PDAs), and handheld PCs. Embedded applications include a microcontroller, a digital signal processor (DSP), a system on a chip, network computers (NetPC), set-top boxes, network hubs, wide area network (WAN) switches, or any other system that can perform the functions and operations taught below.

The method and apparatus described herein are for providing hardware address translation mapping protections (e.g. disjoint virtual address space to the same physical address space mapping safeguards to enable memory access re-ordering within atomic sections of code). Specifically, address translation mapping protections are discussed with regard to transactional execution with a microprocessor, such as processor 100. Yet, the apparatus' and methods described herein are not so limited, as they may be implemented in conjunction with alternative processor architectures, as well as any device including multiple processing elements. For example, address translation mapping guarantees may be implemented in other types of integrated circuits and logic devices. Or it may be utilized in small form-factor devices, handheld devices, SOCs, or embedded applications, as discussed above. Additionally, address translation mapping guarantees may also be implemented for re-ordering techniques that are not related to transactional execution.

Referring to FIG. 1, an embodiment of a processor including multiple cores is illustrated. Processor 100 includes any processor or processing device, such as a microprocessor, an embedded processor, a digital signal processor (DSP), a network processor, a handheld processor, an application processor, a co-pocessor, or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. Yet to further the discussion, the functional units illustrated in core 101 are described in further detail below, as the units in core 102 operate in a similar manner.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e. four logical processors or processing elements capable of executing four software threads concurrently. As eluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in rename allocater logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first Instruction Set Architecture (ISA), which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache 110, which is to cache recently fetched elements. Note that higher-level or further-out refers to cache levels increasing or getting further way from the execution unit(s). In one embodiment, higher-level cache 110 is a last-level data cache—last cache in the memory hierarchy on processor 100—such as a second or third level data cache. However, higher level cache 110 is not so limited, as it may be associated with or include an instruction cache. A trace cache—a type of instruction cache—instead may be coupled after decoder 125 to store recently decoded traces.

In the depicted configuration, processor 100 also includes bus interface module 105 to communicate with devices external to processor 100, such as system memory 175, a chipset (often including a memory controller hub to connect to memory 175 and an I/O controller hub to connect peripheral devices), a memory controller hub, a northbridge, or other integrated circuit. Bus 105 may include any known interconnect, such as mutli-drop bus, a point-to-point interconnect, a serial interconnect, a parallel bus, a coherent (e.g. cache coherent) bus, a layered protocol architecture, a differential bus, and a GTL bus. Memory 175 may be dedicated to processor 100 or shared with other devices in a system. Common examples of types of memory 175 include dynamic random access memory (DRAM), static RAM (SRAM), non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Note that in the depicted embodiment, the controller hub and memory are illustrated outside of processor 100. However, the implementations of the methods and apparatus' described herein are not so limited. In fact, as more logic and devices are being integrated on a single die, such as System on a Chip (SOC), each of these devices may be incorporated on processor 100. For example in one embodiment, memory controller hub is on the same package and/or die with processor 100. Here, a portion of the core (an on-core portion) includes a controller hub for interfacing with other devices such as a controller hub. In the SOC environment, even more devices, such as the network interface, co-processors, and any other known computer devices/interface may be integrated on a single die or integrated circuit to provide small form factor with high functionality and low power consumption.

In one embodiment, processor 100 is capable of hardware transactional execution, software transactional execution, or a combination/hybrid thereof. A transaction, which may also be referred to as execution of a critical or atomic section/region of code, includes a grouping of instructions or operations to be executed as an atomic group. For example, instructions or operations may be used to demarcate or delimit a transaction or a critical section. In one embodiment, which is described in more detail below, these instructions are part of a set of instructions, such as an Instruction Set Architecture (ISA), which are recognizable by hardware of processor 100, such as decoder(s) 125 described above. Often, these instructions, once compiled from a high-level language to hardware recognizable assembly language include operation codes (opcodes), or other portions of the instructions, that decoder(s) 125 recognize during a decode stage.

Typically, during execution of a transaction, updates to memory are not made globally visible until the transaction is committed. As an example, a transactional write to a location is potentially visible to a local thread; yet, in response to a read from another thread the write data is not forwarded until the transaction including the transactional write is committed. While the transaction is still pending, data items/elements loaded from and written to within a memory are tracked, as discussed in more detail below. Once the transaction reaches a commit point, if conflicts have not been detected for the transaction, then the transaction is committed and updates made during the transaction are made globally visible. However, if the transaction is invalidated during its pendency, the transaction is aborted and potentially restarted without making the updates globally visible. As a result, pendency of a transaction, as used herein, refers to a transaction that has begun execution and has not been committed or aborted, i.e. pending.

A Software Transactional Memory (STM) system often refers to performing access tracking, conflict resolution, or other transactional memory tasks within or at least primarily through execution of software or code. In one embodiment, processor 100 is capable of executing transactions utilizing hardware/logic, i.e. within a Hardware Transactional Memory (HTM) system. Numerous specific implementation details exist both from an architectural and microarchitectural perspective when implementing an HTM; most of which are not discussed herein to avoid unnecessarily obscuring the discussion. However, some structures, resources, and implementations are disclosed for illustrative purposes. Yet, it should be noted that these structures and implementations are not required and may be augmented and/or replaced with other structures having different implementation details. Another execution technique closely related to transactional memory includes lock elison {often referred to as hardware lock elision (HLE)}. In this scenario, lock instruction pairs (lock and lock release) are replaced (either by a user, software, or hardware) with atomic start and end delimiting insructions. And the section of code between the lock instruction pairs is executed like a transaction.

As a combination, processor 100 may be capable of executing transactions using a hybrid approach (both hardware and software), such as within an unbounded transactional memory (UTM) system, which attempts to take advantage of the benefits of both STM and HTM systems. For example, an HTM is often fast and efficient for executing small transactions, because it does not rely on software to perform all of the access tracking, conflict detection, validation, and commit for transactions. However, HTMs are usually only able to handle smaller transactions, while STMs are able to handle larger size transactions, which are often referred to as unbounded sized transactions. Therefore, in one embodiment, a UTM system utilizes hardware to execute smaller transactions and software to execute transactions that are too big for the hardware. As can be seen from the discussion below, even when software is handling transactions, hardware may be utilized to assist and accelerate the software; this hybrid approach is commonly referred to as a hardware accelerated STM, since the primary transactional memory system (bookkeeping, etc) resides in software but is accelerated using hardware hooks.

Returning the discussion to FIG. 1, in one embodiment, processor 100 includes monitors to detect or track accesses, and potential subsequent conflicts, associated with data items. A data item, data object, or data element, such as data item 201, may include data at any granularity level, as defined by hardware, software or a combination thereof. A non-exhaustive list of examples of data, data elements, data items, or references thereto, include a memory address, a data object, a class, a field of a type of dynamic language code, a type of dynamic language code, a variable, an operand, a data structure, and an indirect reference to a memory address. However, any known grouping of data may be referred to as a data element or data item. A few of the examples above, such as a field of a type of dynamic language code and a type of dynamic language code refer to data structures of dynamic language code. To illustrate, dynamic language code, such as Java™ from Sun Microsystems, Inc, is a strongly typed language. Each variable has a type that is known at compile time. The types are divided in two categories—primitive types (boolean and numeric, e.g., int, float) and reference types (classes, interfaces and arrays). The values of reference types are references to objects. In Java™, an object, which consists of fields, may be a class instance or an array. Given object a of class A it is customary to use the notation A::x to refer to the field x of type A and a.x to the field x of object a of class A. For example, an expression may be couched as a.x=a.y+a.z. Here, field y and field z are loaded to be added and the result is to be written to field x.

Therefore, monitoring/buffering memory accesses to data items may be performed at any of data level granularity. For example in one embodiment, memory accesses to data are monitored at a type level. Here, a transactional write to a field A::x and a non-transactional load of field A::y may be monitored as accesses to the same data item, i.e. type A. In another embodiment, memory access monitoring/buffering is performed at a field level granularity. Here, a transactional write to A::x and a non-transactional load of A::y are not monitored as accesses to the same data item, as they are references to separate fields. Note, other data structures or programming techniques may be taken into account in tracking memory accesses to data items. As an example, assume that fields x and y of object of class A (i.e. A::x and A::y) point to objects of class B, are initialized to newly allocated objects, and are never written to after initialization. In one embodiment, a transactional write to a field B::z of an object pointed to by A::x are not monitored as memory access to the same data item in regards to a non-transactional load of field B::z of an object pointed to by A::y. Extrapolating from these examples, it is possible to determine that monitors may perform monitoring/buffering at any data granularity level.

Note these monitors, in one embodiment, are the same attributes (or included with) the attributes described above for acceleration of an STM. In this scenario, monitors may double as hardware tracking and software acceleration support. For example, hardware of processor 100 includes read monitors and write monitors to track loads and stores, which are determined to be monitored, accordingly. Hardware read monitors and write monitors may monitor data items at a granularity of the data items despite the granularity of underlying storage structures. Or alternatively, they monitor at the storage structure granularity. In one embodiment, a data item is bounded by tracking mechanisms associated at the granularity of the storage structures to ensure the at least the entire data item is monitored appropriately.

As a specific illustrative example, read and write monitors include attributes associated with cache locations, such as locations within lower level data cache 150 (which in some embodiments includes a speculative cache), to monitor loads from and stores to addresses associated with those locations. Here, a read attribute for a cache location of data cache 150 is set upon a read event to an address associated with the cache location to monitor for potential conflicting writes to the same address. In this case, write attributes operate in a similar manner for write events to monitor for potential conflicting reads and writes to the same address. To further this example, hardware is capable of detecting conflicts based on snoops for reads and writes to cache locations with read and/or write attributes set to indicate the cache locations are monitored. Inversely, setting read and write monitors, or updating a cache location to a buffered state, in one embodiment, results in snoops, such as read requests or read for ownership requests, which allow for conflicts with addresses monitored in other caches to be detected.

Therefore, based on the design, different combinations of cache coherency requests and monitored coherency states of cache lines result in potential conflicts, such as a cache line holding a data item in a shared, read monitored state and a snoop indicating a write request to the data item. Inversely, a cache line holding a data item being in a buffered write state and an external snoop indicating a read request to the data item may be considered potentially conflicting. In one embodiment, to detect such combinations of access requests and attribute states snoop logic is coupled to conflict detection/reporting logic, such as monitors and/or logic for conflict detection/reporting, as well as status registers to report the conflicts.

However, any combination of conditions and scenarios may be considered invalidating for a transaction. Examples of factors, which may be considered for non-commit of a transaction, includes detecting a conflict to a transactionally accessed memory location, losing monitor information, losing buffered data, losing metadata associated with a transactionally accessed data item, and detecting an other invalidating event, such as an interrupt, ring transition, or an explicit user instruction.

In one embodiment, hardware of processor 100 is to hold transactional updates in a buffered manner. As stated above, transactional writes are not made globally visible until commit of a transaction. However, a local software thread associated with the transactional writes is capable of accessing the transactional updates for subsequent transactional accesses. As a first example, a separate buffer structure is provided in processor 100 to hold the buffered updates, which is capable of providing the updates to the local thread and not to other external threads.

In contrast, as another example, a cache memory, such as data cache 150, is utilized to buffer the updates, while providing the same transactional functionality. Here, cache 150 is capable of holding data items in a buffered coherency state. In one case, a new buffered coherency state is added to a cache coherency protocol, such as a Modified Exclusive Shared Invalid (MESI) protocol to form a MESIB protocol. In response to local requests for a buffered data item—data item being held in a buffered coherency state, cache 150 provides the data item to the local processing element to ensure internal transactional sequential ordering. However, in response to external access requests, a miss response is provided to ensure the transactionally updated data item is not made globally visible until commit. Furthermore, when a line of cache 150 is held in a buffered coherency state and selected for eviction, the buffered update is not written back to higher level cache memories—the buffered update is not to be proliferated through the memory system, i.e. not made globally visible, until after commit. Instead, the transaction may abort or the evicted line may be stored in a speculative structure between the data cache and the higher level cache memories, such as a victim cache. Upon commit, the buffered lines are transitioned to a modified state to make the data item globally visible.

Note that the terms internal and external are often relative to a perspective of a thread associated with execution of a transaction or processing elements that share a cache. For example, a first processing element for executing a software thread associated with execution of a transaction is referred to a local thread. Therefore, in the discussion above, if a store to or load from an address previously written by the first thread, which results in a cache line for the address being held in a buffered coherency state, is received, then the buffered version of the cache line is provided to the first thread since it is the local thread. In contrast, a second thread may be executing on another processing element within the same processor, but is not associated with execution of the transaction responsible for the cache line being held in the buffered state—an external thread; therefore, a load or store from the second thread to the address misses the buffered version of the cache line, and normal cache replacement is utilized to retrieve the unbuffered version of the cache line from higher level memory.

In one embodiment, processor 100 is capable of executing a compiler, optimization, and/or translator code 177 to compile application code 176 to support transactional execution, as well as to potentially optimize application code 176, such as perform re-ordering. Here, the compiler may insert operations, calls, functions, and other code to enable execution of transactions, as well as provide software support for memory operation re-ordering.

A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization. The intersection of transactional execution and dynamic code compilation potentially results in enabling more aggressive optimization, while retaining necessary memory ordering safeguards.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts transactional operations, calls, functions, etc. in one or more phases of compilation, such as insertion of calls/operations in a front-end phase of compilation and then transformation of the calls/operations into lower-level code during a transactional memory transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Nevertheless, despite the execution environment and dynamic or static nature of a compiler; the compiler, in one embodiment, compiles program code to enable transactional execution and/or optimize sections of program code. Similar to a compiler, a translator, such as a binary translator, translates code either statically or dynamically to optimize and/or translate code. Therefore, reference to execution of code, application code, program code, a STM environment, or other software environment may refer to: (1) execution of a compiler program(s), optimization code optimizer, or translator either dynamically or statically, to compile program code, to maintain transactional structures, to perform other transaction related operations, to optimize code, or to translate code; (2) execution of main program code including transactional operations/calls, such as application code that has been optimized/compiled; (3) execution of other program code, such as libraries, associated with the main program code to maintain transactional structures, to perform other transaction related operations, or to optimize code; or (4) a combination thereof.

Often within software transactional memory (STM) systems, a compiler will be utilized to insert some operations, calls, and other code in-line with application code to be compiled, while other operations, calls, functions, and code are provided separately within libraries. This potentially provides the ability of the libraries distributors to optimize and update the libraries without having to recompile the application code. As a specific example, a call to a commit function may be inserted inline within application code at a commit point of a transaction, while the commit function is separately provided in an updateable library. And the commit function includes an instruction or operation, when executed, to reset speculative bits of a translation buffer, as described in more detail below. Additionally, the choice of where to place specific operations and calls potentially affects the efficiency of application code. As another example, binary translation code is provided in a firmware or microcode layer of a processing device. So, when binary code is encountered, the binary translation code is executed to translate and potentially optimize (including memory re-ordering) the code for execution on the processing device.

And as described herein, hardware structures, in one embodiment, are provided to support such optimization within transactional regions (critical sections), while ensuring valid execution when different virtual address pages are mapped to the same physical page. As a result, software optimizations, such as automatic vector widening (e.g. widening 128 bit vector instructions to 256 bit vector instructions), may be performed within atomic sections of code without the concern that the optimizations would result in invalid execution.

In one embodiment, during execution of a hardware atomic section of code (either due to transactional execution or hardware lock elision), if two atomic memory operations to two different virtual address pages/spaces result in a virtual to physical translation to the same physical memory space, then the atomic section is failed/aborted. As an example, hardware structures are included or modified to detect such a translation scenario and abort the transaction. Therefore, software (a compiler, optimizer, and/or translator), which in some cases, is ill suited to detect such translation problems performs the optimizations and relies on hardware to protect data integrity.

As an illustrative embodiment, a speculative access bit (s-bit) is added to entries of a translation buffer, such as a data translation lookaside buffer (d-TLB). The bits are reset to a default value at a start of an atomic section (or analogously at the end of a previous critical section). And a bit for a given TLB entry is set to an accessed value when a memory operation causes a translation to be performed that utilizes the given TLB entry. Additionally, when the s-bit for an entry is set, hardware determines if a translated, physical address for the entry corresponds to (either through a filter or directly matching) another physical address for another TLB entry that also has its s-bit set to the accessed value. If hardware determines another entry has a corresponding physical address (and that its s-bit is also set), then the transaction associated with the memory operation is failed/aborted. As alluded to above, a hardware determination that physical addresses correspond may be perform at any granularity (iteratively through each TLB entry or by grouping/filtering TLB entries).

For example, a bloom filter may be utilized to determine if a physical address maps to a same set as other physical addresses in the TLB. And if it does belong to the same set, then it may be further determined if the physical address matches a physical address from that set. Also, in some embodiments, a transaction is failed when a TLB entry with its s-bit set to the accessed value is selected for eviction. In this scenario, it may be beneficial to bias a TLB replacement algorithm from evicting entries with their s-bit set to the accessed value.

Figure 2:
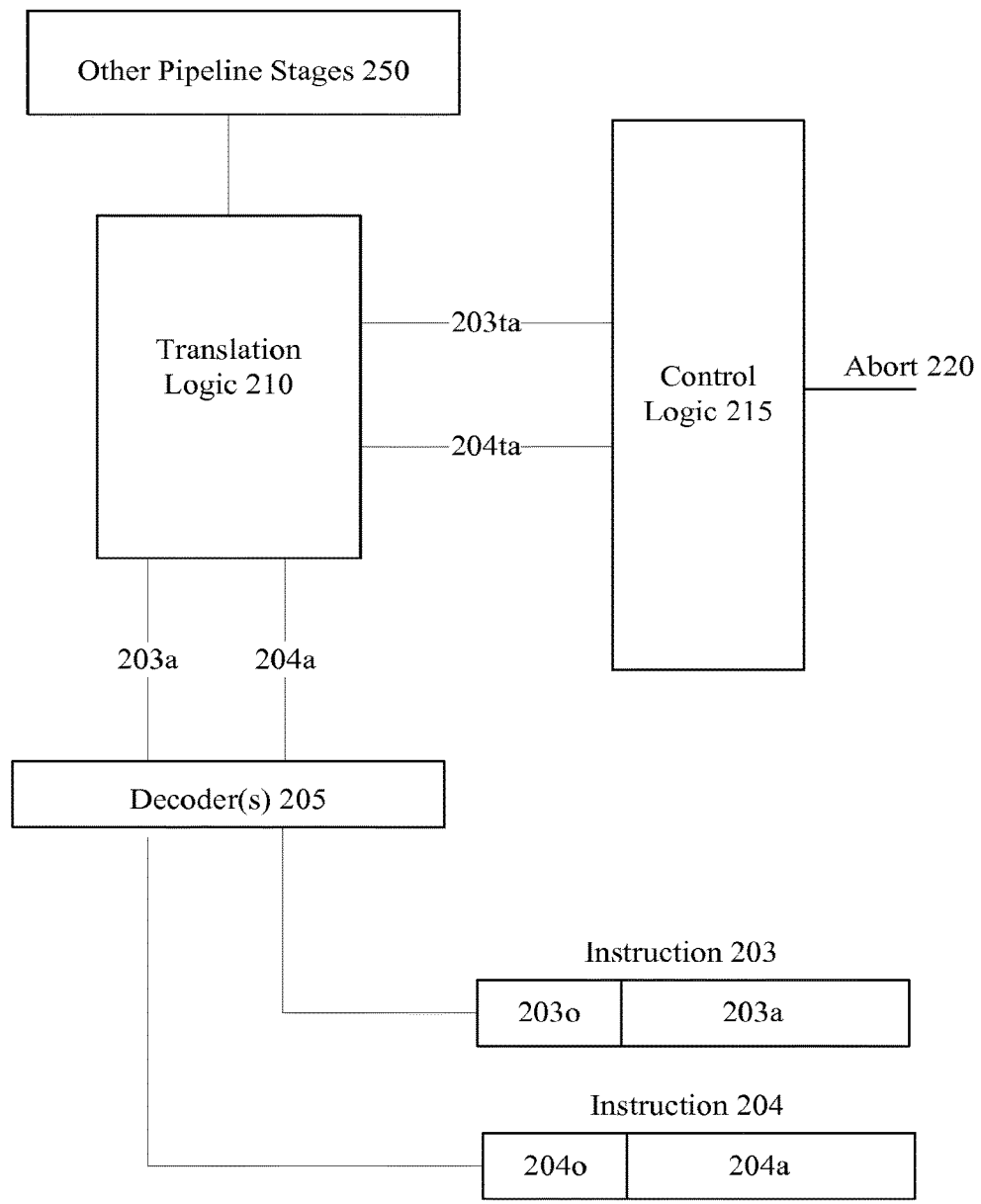
FIG. 2 illustrates an embodiment of a logical representation of modules for providing support for detecting multiple virtual addresses to the same physical address.

Turning to FIG. 2, an embodiment of a logical representation of modules to provide support for detecting and/or handling multiple un-translated addresses that translate to corresponding translated addresses is depicted. Note in the discussion below, an exemplary embodiment of an un-translated address (a virtual address) and a translated address (a physical address) is utilized to further the discussion. However, the methods and embodiments described herein may be utilized in reference to any translation of addresses, as well as any structures to hold recent versions of those translations.

In one embodiment, decoder(s) 205 is configured to decode instructions recognizable as part of an Instruction Set Architecture defined for processor 200. Here, decode logic 205 is configured to decode a first transactional memory access operation (instruction 203) to reference a first virtual address (virtual address 203a). As an example, decoders 205 recognize an operation code (op code 203o) of instruction 203 to identify the instruction from an ISA. And the rest of processor 200's pipeline (other stages 250), stages, logic (translation logic 210), firmware, etc. takes predefined actions based on the identification of instruction 203 by decoder(s) 205.

As shown, instruction 203 illustratively includes a speculative operation, which is part of a critical/atomic section of code. For example, a speculative operation that is part of a critical section of code includes a start atomic/transactional/critical section instruction, an end atomic/transactional/critical section instruction, an atomic/transactional/critical section memory access instruction, etc. Similarly, decoder(s) 205 are also configured to recognize and decode instruction 204, which references operation code 204o and virtual address 204a. When virtual addresses 203a and 204a are the same, then translation logic 210 typically performs the same translation to a physical address. Consequently, to speed up the translation, logic 210 often includes a buffer to hold recent translations. As a result, subsequent translations are accelerated, since walking of page tables to perform a translation is potentially avoided when the translation is already held in a buffer.

In contrast, if the virtual addresses 203a, 204a are different, then two different translations are performed (i.e. a virtual address indexed translation buffer includes two translation entries; one for virtual address 203a and one for virtual address 204a. In other words, translation logic 210 translates virtual memory address 203a into a physical (or translated) address 203ta. And similarly, virtual address 204a is translated into translated address 204ta. Note that address translation, such as translation utilizing page tables that are often individually associated with threads, is not specifically described herein to avoid unnecessarily obscuring the discussion.

Upon each translation, a translation buffer entry is created, stored, and/or updated to hold virtual address 203a corresponding to or associated with translated address 203ta and virtual address 204a with translated address 204ta. Previously, software (during static analysis or with runtime checks) potentially avoids re-ordering accesses to the same virtual memory address. Yet, where two different virtual addresses 203a, 204a map to the same physical address, software is potentially unable to detect and avoid this scenario; it may then lead to invalid execution (RAW, WAR, or WAW case). But in one embodiment, modules, such as translation logic 210 and control logic 215, are to ensure this scenario does not result in invalid execution.

Consequently, in one embodiment, each translation entry is to include (or be associated with) a speculative access field. When translation logic 210 updates a translation entry with a new translation (i.e. update a translation entry with a translation of un-translated address 203a associated with translated address 203ta responsive to decoder(s) 205 decoding instruction 203), translation logic 210 is also configured or adapted to update the corresponding speculative access field to an accessed value; this is to indicate that the corresponding translation buffer entry has been transactionally or speculatively accessed.

Moreover, in one embodiment, control logic 215 is configured to fail a transaction associated with a speculative memory operation (e.g. instruction 204) in response to translated address 203ta directly corresponding to translated address 204ta. In other words, if two different, speculatively accessed translation buffer entries hold translated addresses that directly correspond to each other, then a transaction associated with at least one of the translation buffer entries is aborted. Another way of stating it with respect to virtual and physical addresses is: if two different, speculatively accessed virtual addresses translate to corresponding physical addresses (as indicated by the contents of two different translation buffer entries), then a transaction associated with the entries is to be aborted/failed.

Here, assume instruction 203 has been fetched (an instruction pointer was moved to reference instruction 203 and fetch logic obtained the instruction 203 from memory or a cache). And then instruction 203 was decoded by decoders 205. In response, translation logic 210 translates virtual address 203a to physical address 203ta and performs the predetermined operation(s) in pipeline stages 250 with respect to the referenced address 203ta. After the translation, translation logic 210 caches or stores the translation in a structure, such as a translation buffer. Moreover, assuming instruction 203 is a speculative instruction, such as a transactional memory access operation, translation logic 210 sets a speculative bit associated with cached or stored translation entry.

When instruction 204 is encountered, a similar process is followed. And upon updating the translation buffer entry (and the speculative bit therefore), control logic 215 determines if another speculatively accessed translation buffer entry holds a corresponding translated address (an address corresponding to 204ta). Inherently, the previous statement includes: (1) determining if a translation buffer entry is speculatively accessed and (2) determining if a translation buffer entry holds a physical address that corresponds to physical address 204ta. Yet, such determining may be performed in any order.

As a first example, a set of speculatively accessed buffer entries is determined (i.e. all entries with their speculative access bit set, which may be limited to a specific thread or span all threads that share access to the translation buffer based on the design implementation). Then, the set of speculatively accessed entries is searched to determine if they hold an address that corresponds to physical address 204ta. Alternatively, the translation buffer is searched for a physical address that corresponds to physical address 204ta. And if such a corresponding physical address is found, then it's determined if the associated translation buffer entry is marked as speculatively accessed. As a combination, a TLB may be iteratively searched, such as with a hardware state machine, to determine if an entry both holds an address that corresponds to physical address 204ta and is marked as speculatively accessed; this searching may also be broken into parts (e.g. determine if speculatively accessed and move on without address comparison if not speculatively accessed) or performed simultaneously (e.g. the speculative bit is appended to address 204ta for the comparison process).

As another example, a filter or algorithm is utilized to determine if a translation buffer holds any addresses that correspond to physical address 204ta. Here, a filter, such as a bloom filter, is utilized. Physical addresses, such as address 204ta, of the translation buffer are mapped onto (e.g. hashed into) a set of bloom filter bits. And if two physical addresses map into the same set, in one embodiment, they are determined to be corresponding physical addresses. Note that this scenario encompasses a larger granularity for physical addresses to correspond to each other (i.e. multiple physical addresses may be found to correspond to one another). But the overhead of determining an exact physical address match is potentially reduced, because a fully address comparison is potentially avoided.

The level or range of addresses that correspond to each other is a design implementation choice that may be varied to achieve more aborts (a greater number of addresses that correspond through bigger groupings of corresponding addresses, which is likely lead to more conflicts and aborts) or less aborts (fine grained exact physical address matching to only abort when two virtual address map to the exact same physical address). In addition, a multi-tiered approach may be utilized. Here, a filter is initially applied to see if any other translation buffer entries hold a physical address that hash into a same set as address 204ta. If no other buffer entries hold such a physical address, then there is no conflict and execution continues normally. However, if one or more address are found to correspond at the filter level, then an address comparison is performed to determine if one of the filtered set matches address 204ta. As a result, the case where no filtered addresses correspond, the check is substantially accelerated. And even when exactly corresponding addresses exist in the translation buffer for address 204ta, the check is potentially accelerated through narrowing down the entries with a filter, such that address comparison is potentially performed on a smaller number of addresses.

Therefore, whether through iterative search, filtering, or any other known method of finding contents in a structure, assume in this example that physical address 204ta and 203ta correspond. And that both addresses 203ta, 204ta were speculatively accessed by different virtual addresses (e.g. two buffer entries that are marked as speculatively accessed based on two different virtual addresses hold physical addresses 203ta, 204ta, respectively). In one embodiment, control logic 215 initiates an abort or failure of the atomic section of code associated with instruction 204.

Note that in an embodiment where the speculative bits are reset at the start or end of a transaction, it may be assumed that the two entries are associated with the same critical section.

Here, initiating an abort of a transaction may be as simple as asserting (or inversely de-asserting) abort signal 220, which may cause an abort field in a register (e.g. a status register) to be updated. And an associated transaction is aborted (either synchronously or asycnhronously) in response to the status register being updated. Often in a hardware transactional memory system, a checkpoint of the architecture state and memory state is taken before beginning execution of a transaction. In this scenario, an abort often entails rolling back such architecture state and memory state to that checkpoint. However, where an HTM utilizes a cache memory to hold tentative updates. The transactionally accessed lines may be marked dirty or invalid. And the previous data (i.e. data from the checkpoint) may be brought into the cache from higher-level memory on demand.

In one embodiment, control logic 215 is further configured to fail a transaction in response to a translation buffer entry (for either virtual address 203a to physical address 203ta or virtual address 204a to physical address 204ta) that is marked as speculatively accessed (when an associated speculative access field holds a speculatively accessed value) is evicted from the translation buffer. In reality a translation buffer has limited space. As a result, assume a translation is performed for instruction 203 as stated above and a buffer entry is updated with a speculative access field set to an accessed value associated with address 203a corresponding to address 203ta. Then, the translation buffer fills up and needs space for a new translation. If the buffer entry is evicted without failure of the transaction and instruction 204 is then encountered when addresses 203ta and 204ta match, then there is no way to detect the conflict, as the speculative access information for the translation regarding address 203ta has been evicted and lost. So, in one embodiment, upon eviction of a speculative buffer entry, the current transaction is aborted or failed; an indication that the transaction ran out of hardware resources to adequately ensure data integrity.

As a potential design implementation embodiment, the control logic 215 is then to replace translation buffer entries that don't have their speculative bits set before entries that are not speculatively marked. The most typical replacement algorithm for such structures is a least recently used (i.e. if a buffer entry is the oldest, then get rid of that first). However, in this example, a LRU algorithm may be modified to be biased against replacing speculatively access translation buffer entries in regards to non-speculatively accessed entries. For example, even when a speculatively access buffer entry is the least recently used entry, a non-speculatively accessed buffer entry is selected for eviction to preserve the speculative tracking. However, note that being biased against such replacement may not be absolute in regards to selecting a non-speculative entry over a speculative entry. In other words, according to the policy, a hint, or other factor, a speculative buffer entry may be replaced before a non-speculatively accessed buffer entry.

As a result of such protections, software is enabled to perform optimizations, such as instruction re-ordering, within atomic sections of code with respect to virtual address. In other words, software is able to make the assumption that two different virtual addresses don't access the same physical address. And during runtime execution of an atomic section of code, such as execution of a hardware transaction in a HTM environment or a critical section in a HLE environment, if two different virtual accesses reference the same physical location, then hardware initiates an abort of the atomic section to ensure any software optimizations made with the base assumption mentioned above don't cause any adverse effects.

Figure 3:
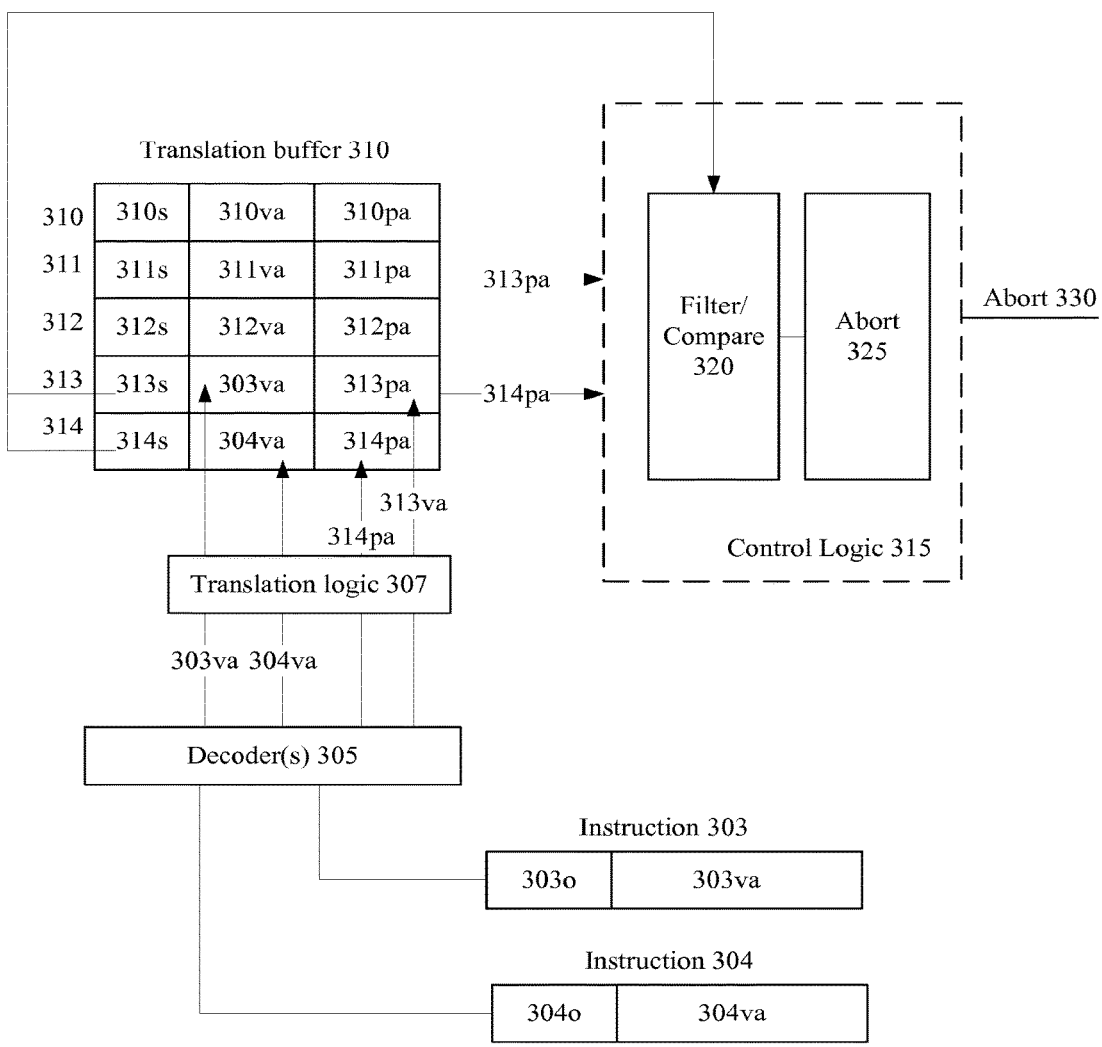
FIG. 3 illustrates another embodiment of a logical representation of modules for providing support for detecting multiple virtual addresses to the same physical address.

Referring next to FIG. 3, an embodiment of logical representations of hardware structures to provide support for software re-ordering of memory access operations within atomic sections of code is illustrated. Similar to the discussion of FIG. 2, decode logic 305 is configured to decode transactional memory operations 303 and 304, which may also be referred to as atomic or speculative operations from a critical or atomic section of code.

Translation buffer 310 includes translation buffer entries 310-314 that are to hold recent translations. Note that translation buffer 310 may include any buffer for holding two values or addresses that are related through an algorithm to each other, such as a data translation lookaside buffer (dTLB) that is to hold virtual to physical address translations. As illustrated, each of translation buffer entries 310-314 include (or are associated with) a speculative access field (speculative access fields 310s-314s, respectively).

As an example, during runtime, decoder(s) 305 detect and decode instruction 303. Translation logic 307 translates virtual address 303a into physical address 313pa and stores the translation in entry 313. Moreover, assuming instruction 303 includes a speculative instruction, such as a memory access instruction from an atomic section of code, speculative field 313s is updated to a speculatively accessed value to indicate buffer 313 has been speculatively accessed. In one embodiment, field 313s includes a storage cell to hold a 'bit' (i.e. a logical value). Here, bit 313s may have a default or reset value, such as a logical one or logical high, and a set (or speculatively accessed value), such as a logical zero or logical low.

In a similar manner, decoder(s) 305 decode instruction 304, perform a translation to obtain physical address 314pa, store the translation in entry 314, and update speculative access bit 314s to a speculatively accessed value. Although, in some embodiments the search described below is performed before translation entry 314 is updated; therefore, such updates don't have to be performed if an abort is to occur. Despite the order, control logic 315 determines if another translation buffer entry in buffer 310 includes a corresponding physical address. As stated above, in one embodiment compare logic 320 includes a hardware state machine to iteratively search translation buffer 310 to determine if an entry, such as translation buffer entry 313, which is associated with speculative access field 313s holding the speculatively accessed value, references translated physical address 314a. First note that a similar search may be performed upon the initial decode of instruction 303. Second, the search of buffer 310, in one example, includes a search through each of entry 310-313 (excluding 314 since it includes the search criteria of address 314pa). And in the search, it's determined if all or part of the physical addresses, such as physical address 310pa-313pa, match all or the corresponding part of address 314a In some embodiments a partial or full address match may only be a single criterion for an abort or fail. Here, if entry 313 is not also marked as speculatively accessed (bit 313s is set), then there is no conflict. Also, once a conflict is determined during the search, an abort or fail of the atomic section may be initiated without completing the search. Continuing the example above, assume that physical address 313a matches physical address 314pa. In this case, compare logic 320 compares physical address 310a-312a with no match. But upon comparing physical address 314*a* and 313*a* a match is found. And either during that comparison, as part of that comparison, or separately, it's determined that entry 313 was speculatively accessed from field 313*s*. For example, the speculative access field 313*s* may be appended to physical address 313*a* to compare with field 314*s* appended to 314*a*. An exact match indicates that both the addresses match and the speculative bits are set to an accessed value.

However, an exact address match and an iterative search through the entire buffer 310 is not required. In other embodiments, filters may be utilized to group addresses together. And if any of the group or set of addresses are in the translation buffer, then an abort may be initiated or a further search may be performed. For example, instead of matching all of address 314*a*, a portion of address 314*a* is used. Here, a portion of address 314*a* essentially refers to multiple potential addresses that match those specific bits. In other words, accuracy for specific address matching is sacrificed for speed. However, if too many aborts are occurring due to address groupings being too large, then the groups may be dynamically sized or further searching after a match within a group may be performed. Or, it's first determined that entry 313 was speculatively accessed based on field 313*s*. And subsequently, an address comparison of physical address 313*pa* and 314*pa* leads to an address match.

As another example, logic 320 includes bloom filer logic, which is to hash address 314*pa* into a set of bits. Here, multiple addresses hash into the same set. And if physical address 313*pa* matches address 314*pa*, as in the example above, then bloom filter logic 320 determines that they belong to the same set. As a result of belonging to the same set, it's determined that the addresses correspond. From this information, in one embodiment, a transaction failure is initiated, such as with abort signal 330. In another alternative, where a bloom filter is or would result in too many aborts, if addresses match to the same set, then an iterative search similar to the discussion above is performed within the set. For example, assume that addresses 312*pa*-314*pa*, when hashed by filter logic 320 all map to the same set. Here, instead of searching all of buffer 310 for an address match, entries 312-313 are searched; this potentially eliminates having to compare entries 310-311. In this example, the physical address match is found in entry 313 after searching two entries instead of the entire buffer, which results in an abort. Note that if no match is found, extraneous aborts created by the filtered groupings may be eliminated at an extra search cost. Therefore, a designer (or dynamic runtime adjustment) is able to balance a number of potential aborts with search speed and efficiency.

In another embodiment, instruction 303 includes a delimiting instruction that is to delimit an atomic section of code to be executed. Here, decoder(s) 305 is to decode delimiting instruction 303, which references address 303*va*. Often a delimiting instruction includes a start critical section instruction or an end critical section instruction. As an example, for transactional execution a user or compiler inserts a start and/or end atomic section instruction to delimit (define) a critical section of code for execution. Similarly in HLE a lock and lock release pair is replaced either by software, firmware, hardware, or combination thereof with a begin and end critical section instruction, which results in the lock pair being elided and the critical section being executed like a transaction. As described above, a delimiting instruction, in one embodiment, may include a call to a start transaction or end transaction function, which is provided in library code.

Therefore, reference to performing an operation, such as resetting speculative bits as described below, may be in reference to an instruction or operation inserted in-line to call a library function or an instruction or operation within the library function.

Here, in response to decode(s) 305 decoding delimiting instruction 303, speculative access field 310*s*-314*s* are reset to a default value. Therefore, either upon starting a transaction, ending a transaction, or both, the speculative access fields are reset. As a result, speculative accesses from a current transaction don't cause aborts based on speculative accesses from a previous transaction that has already been committed. For example, a start transaction library function includes a 'delimiting' instruction, when executed, to reset speculative fields 310*s*-314*s*, so the fields start at a non-speculatively accessed value. In other words, a fresh start for tracking of atomic translations in translation buffer 310 is obtained. Note that similar to other resource sharing between threads or processing elements, a processing element identifier (PID) may be utilized in conjunction with the speculative access bits 310*s*-314*s* for setting, searching, and resetting to enable multiple threads to share access to buffer 310.

Figure 4:
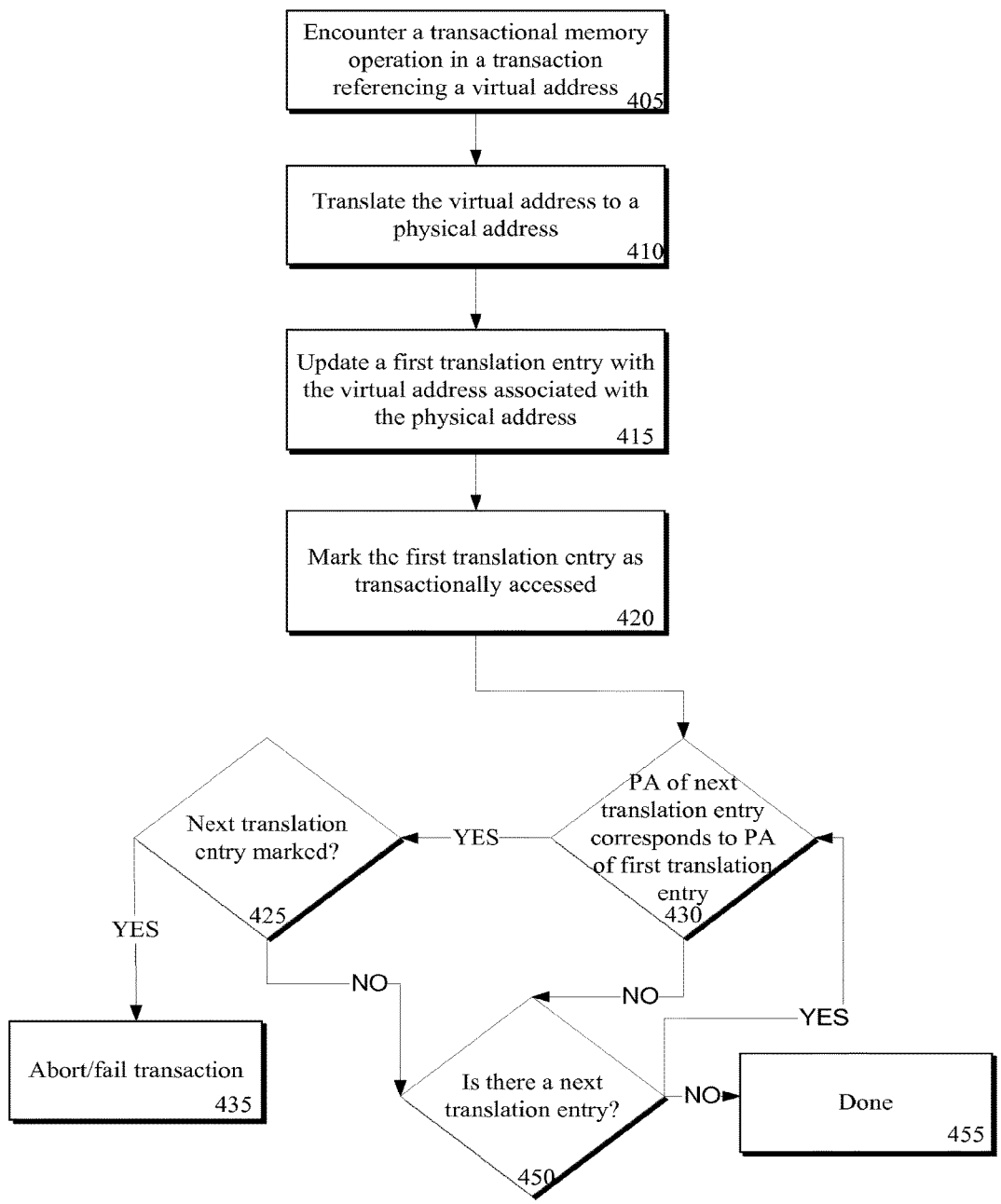
FIG. 4 illustrates an embodiment of a flow diagram for a method of aborting a transaction upon determining different, transactionally accessed virtual addresses map to a corresponding physical address.

Moving to FIG. 4, an embodiment of a flow diagram for a method of aborting a transaction in response to speculatively accessed un-translated address translating to a corresponding translated address is shown. Note that the flows for the flow diagrams of FIG. 4 are illustrated in a substantially serial fashion with a listed order of flows. However, both the serial nature of these flows, as well as the depicted order, are not required. For example, in reference to FIG. 4, based on the design implementation, flows 415 and 420 may not be performed if, in flow 430, a corresponding physical address to a translated address if found before updating translation entries. Also, flows 405-435 are illustrated in a substantially linear or serial fashion. However, the flows may be performed in parallel over the same time period. For example, instead of iteratively searching for translation entries that are marked in flow 425 and then determining if a physical address match exists in flow 430, physical addresses may be compared first and then it may be determined if a matched entry is marked speculative. In addition, any of the illustrated flows may be performed within hardware, software, firmware, or a combination thereof. Moreover, any program code in the form of one or more instructions or operations, when executed, may cause a machine to perform the flows illustrated and described below. Note that the discussion below is in reference to execution of a transaction. However, the flows similarly apply to an atomic section for HLE or other atomic, speculative execution.

From the discussion above, speculatively marked translation entries are reset either upon ending a transaction (abort or commit) or upon beginning a transaction. Then in flow 405, a transactional memory operation from a transaction is encountered. As mentioned above, the memory operation references a memory address, such as a virtual address. Encountering of an operation may be considered at any known stage of processing, such as a pipeline stage selected from a group consisting of a fetch stage when an instruction pointer references the transactional memory operation, a decode stage, a dispatch stage, a schedule stage, an execution stage, and a retirement stage.

In flow 410, the virtual address is translated to a physical address in response to encountering the transactional memory operation. Often, such as translation is done utilizing page tables. And although page tables and address translation is not discussed in detail herein to avoid obscuring the discussion, any known address translation method may be utilized. Next in flow 415 and 420, a first translation entry is updated with the virtual address associated with (corresponding to) the translated, physical address. And the first translation entry is marked as transactionally accessed. For example, a speculative bit associated with, corresponding to, and/or included within the translation entry is set to a specualtively accessed logical value.

Referring to flow 425, it's determined if a second translation entry that is also marked as transactionally accessed corresponds to the physical address from the first translation entry. In one embodiment, correspondence, as discussed above, includes determining if a second physical address held in the second translation entry matches the physical address. As another illustrative example, correspondence includes determining if a second physical address held in the second translation entry maps to a same set as the physical address. Here, a bloom filter may be utilized to determine if both physical addresses belong to the same set.

And whether through filtering or matching, if the physical address correspond, it was already determined that the entry was speculatively marked in flow 425. Therefore in flow 435, the transaction is aborted or failed. As a result, software, firmware, or microcode may perform memory ordering optimizations with regard to un-translated addresses and rely on hardware structures to provide guarantees that such un-translated address that are different don't map to the same physical address. Or at least, if they do map to the same physical address that the speculative, atomic execution that is associated with the translations will be aborted or failed before invalid execution is committed to the memory or architecture state.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a plurality of registers;
   a decoder to decode a first transactional memory access operation that is to reference a first virtual memory address and a second transactional memory access operation that is to reference a second virtual memory address, wherein the first and second transactional memory access operations are both from within a hardware transactional execution transaction among a plurality of operations of the hardware transactional execution transaction that are to be performed atomically, and wherein the first and the second virtual memory addresses are to be different virtual memory addresses; and
   translation logic to translate the first virtual memory address into a first physical address and the second virtual memory address into a second physical address in response to the decoder decoding the first transactional memory access operation and the second transactional memory access operation; and
   control logic, comprising hardware, to fail the hardware transactional execution transaction, that is to include the plurality of operations that are to be performed atomically, in response to the first physical address matches the second physical address, wherein the control logic is also to fail the hardware transactional execution transaction upon selection of a translation lookaside buffer (TLB) entry corresponding to a transactional memory access operation in the hardware transactional execution transaction for eviction by a TLB replacement algorithm.

2. The apparatus of claim 1, wherein the translation logic configured to translate the first virtual memory address into the first physical address and the second virtual memory address into the second physical address comprises:

page table logic to translate the first virtual memory address into the first physical address and the second virtual memory address into the second physical address; and wherein the translation logic includes a translation buffer to hold a first translation buffer entry to include the first virtual memory address corresponding to the first physical address and a second translation buffer entry to include the second virtual memory address corresponding to the second physical address.

3. The apparatus of claim 2, wherein the first translation buffer entry is further to include a first speculative access field and the second translation buffer entry is further to include a second speculative access field, and wherein the translation logic is further to update the first speculative access field to a speculatively accessed value in response to the decoder decoding the first transactional memory access operation of the hardware transactional execution transaction and to update the second speculative access field to the speculatively accessed value in response to the decoder decoding the second transactional memory access operation of the hardware transactional execution transaction.

4. The apparatus of claim 3, wherein the control logic in response to the decoder decoding the second transactional memory access operation, is to:

determine the first translation buffer entry was speculatively accessed as part of the hardware transactional execution transaction in response to the first speculative access field that during processor operation stores the speculatively accessed value;

determine if the first physical address directly corresponds to the second physical address in response to determining the first translation buffer entry was speculatively accessed; and fail the hardware transactional execution transaction in response to determining the first physical address directly corresponds to the second physical address.

5. The apparatus of claim 4, wherein the control logic to determine the first translation buffer entry was speculatively accessed in response to the first speculative access field that during the processor operation stores the speculatively accessed value and determine if the first physical address matches the second physical address in response to determining the first translation buffer entry was speculatively accessed comprises a hardware state machine to compare a physical address that during the processor operation is stored in each translation buffer entry that has an associated speculative access field set to the speculatively accessed value with the second physical address and to determine the first physical address matches the second physical address in response to comparing the first physical address held in the first translation buffer entry with the second physical address and the first physical address matching the second physical address.

6. The apparatus of claim 1, wherein the control logic configured to fail the hardware transactional execution transaction in response to the first physical address matches the second physical address comprises:

bloom filter logic to hash the first physical address and the second physical address into a set of bloom filter bits;

logic to determine that the first physical address matches the second physical address in response to a determination that the hash of the first physical address and the second physical address into the set of the bloom filter bits indicates they are part of a same set.

7. The apparatus of claim 3, wherein the control logic is further to fail the hardware transactional execution transaction in response to a translation buffer entry being evicted from the translation buffer when the translation buffer entry's speculative access field holds the speculatively accessed value.

8. The apparatus of claim 3, wherein the control logic is further to replace a third translation buffer entry before replacing the first translation buffer entry and the second translation buffer entry based in part on that the first speculative access field and the second speculative access field hold the speculatively accessed value.

9. An apparatus comprising:

a decoder to decode an instruction for a transactional memory access from within a hardware transactional execution transaction, wherein the hardware transactional execution transaction is to include the instruction for the transactional memory access among a plurality of updates to memory that are not to be made globally visible until the hardware transactional execution transaction is committed, the transactional memory access to reference an address;

a translation buffer having a speculative access field associated with a translation buffer entry, wherein the translation buffer entry has one or more fields to store the address associated with a translated address, wherein the translation buffer is further to:

update the speculative access field to an accessed value in response to the decoder decoding the instruction for the transactional memory access during the hardware transactional execution transaction; and determine if a second translation buffer entry has a second translated address matching the translated address, the second translation buffer entry included in the translation buffer and the second translation buffer entry associated with a second speculative access field corresponding to the accessed value; wherein the second translation buffer entry is for a second transactional memory access from within the hardware transactional execution transaction; and control logic to initiate an abort of the hardware transactional execution transaction in response to a determination by the translation buffer that the second translation buffer entry has the second translated address matching the translated address, and wherein the control logic is also to initiate an abort of the hardware transactional execution transaction upon selection, by a translation buffer replacement algorithm, for eviction from the translation buffer of an entry in the translation buffer that corresponds to instruction to an instruction for a transactional memory access in the hardware transactional execution transaction.

10. The apparatus of claim 9, wherein the address includes a virtual memory address and the translated address includes a physical address.

11. The apparatus of claim 9, wherein the translation buffer includes a hardware state machine to search the translation buffer to determine the second translation buffer entry associated with the second speculative access field corresponds to the accessed value.

12. The apparatus of claim 9, wherein the translation buffer includes a hardware state machine to search the translation buffer to determine the second translation buffer entry associated with the second speculative access field corresponds to the accessed value and to determine the second translated address matching the translated address in response to a bloom filter hash of an address held in the second translation buffer entry that maps to a set that includes the translated address.

13. A method comprising:
receiving a transactional memory operation from within a hardware transactional execution transaction referencing a virtual address, wherein the hardware transactional execution transaction includes the transactional memory operation among a group of atomic operations;
translating the virtual address to a physical address in response to receiving the transactional memory operation;
in response to translating the virtual address to the physical address,
updating a first translation entry, in a translation lookaside buffer (TLB), with the virtual address associated with the physical address, and
marking the first translation entry as transactionally accessed;
biasing a TLB replacement algorithm against evicting entries of the TLB that have been marked as transactionally executed in favor of entries of the TLB that have not been marked as transactionally executed;
determining if a second translation entry, which is also marked as transactionally accessed, and which is associated with a second transactional memory operation from within the hardware transactional execution transaction, matches the physical address; and
aborting the hardware transactional execution transaction in response to determining the second translation entry has a second physical address matching the physical address.

14. The method of claim 13, wherein receiving the transactional memory operation comprises receiving the transactional memory operation in a pipeline stage selected from a group consisting of a fetch stage when an instruction pointer references the transactional memory operation, a decode stage, a dispatch stage, a schedule stage, an execution stage, and a retirement stage.

15. The method of claim 13, wherein translating the virtual address to the physical address in response to receiving the transactional memory operation includes translating the virtual address to the physical address utilizing page tables.

16. The method of claim 13, wherein marking the first translation entry as transactionally accessed comprises marking a first speculative access bit associated with the first translation entry.

17. The method of claim 13, wherein determining if the second translation entry that is also marked as transactionally accessed corresponds to the physical address comprises determining if the second physical address held in the second translation entry maps to a same set as the physical address.

18. The method of claim 13, wherein aborting the hardware transactional execution transaction in response to determining the second physical address matching the physical address comprises rolling back a memory state and an architecture state to a point before the hardware transactional execution transaction in response to determining the second translation entry corresponds to the physical address.

19. A processor comprising:
a decoder to decode a first instruction and a second instruction from within a hardware transactional execution transaction, the hardware transactional execution transaction to include the first and second instructions among a plurality of instructions that are to be performed atomically, the first instruction associated with a first transactional memory access operation that is to reference a first virtual memory address, the second instruction associated with a second transactional memory access operation that is to reference a second virtual memory address, and wherein the first and the second virtual memory addresses are to be different virtual memory addresses;
a translation buffer to store a translation of the first virtual memory address to a first physical address and to store a translation of the second virtual memory address to a second physical address, wherein the translation buffer is to bias eviction of stored translations against eviction of stored translations that have been marked as having been transactionally executed in favor of eviction of stored translations that have not been marked as having been transactionally executed; and
hardware to fail the hardware transactional execution transaction when the first and second physical addresses are equal.

20. The processor of claim 19, wherein the translation buffer is to have an entry to store the translation of the first virtual memory address to the first physical address, and wherein the entry is to have a speculative access field to store an indication of a speculative access associated with the first physical address.

21. An apparatus comprising:
a plurality of registers;
a decoder to decode a first transactional memory access operation that is to reference a first virtual memory address and a second transactional memory access operation that is to reference a second virtual memory address, wherein the first and second transactional memory access operations are both to be from within a hardware lock elision transaction that is to include a plurality of operations including the first and second transactional memory access operations that are to be performed atomically, and wherein the first and the second virtual memory addresses are to be different virtual memory addresses; and
translation logic to translate the first virtual memory address into a first physical address and the second virtual memory address into a second physical address in response to the decoder decoding the first transactional memory access operation and the second transactional memory access operation; and
control logic, comprising hardware, to fail the hardware lock elision transaction, that is to include the plurality of operations that are to be performed atomically, in response to the first physical address matching the second physical address, and wherein the control logic is also to fail the hardware lock elision transaction in response to selection of a translation lookaside buffer (TLB) entry corresponding to a transactional memory access operation in the hardware lock elision transaction for eviction.

22. The apparatus of claim 21, wherein the translation logic configured to translate the first virtual memory address into the first physical address and the second virtual memory address into the second physical address comprises:
- page table logic to translate the first virtual memory address into the first physical address and the second virtual memory address into the second physical address; and
- wherein the translation logic includes a translation buffer to hold a first translation buffer entry to include the first virtual memory address corresponding to the first physical address and a second translation buffer entry to include the second virtual memory address corresponding to the second physical address.

* * * * *